Dec. 31, 1957  R. LOOSJES  2,818,517
METHOD OF SECURING A MEMBER TO A SHAFT
Filed Oct. 5, 1954
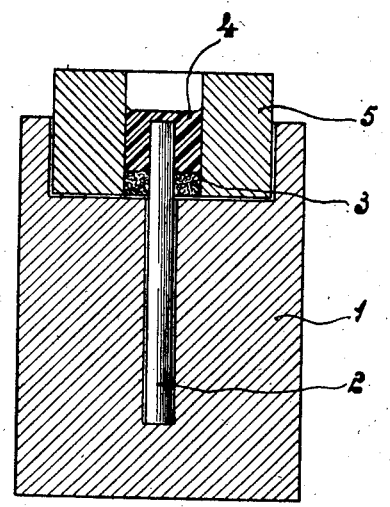
INVENTOR
ROBERT LOOSJES
BY
AGENT

United States Patent Office 2,818,517
Patented Dec. 31, 1957

2,818,517

METHOD OF SECURING A MEMBER TO A SHAFT

Robert Loosjes, Eindhoven, Netherlands, assignor, by mesne assignments, to North American Philips Company, Inc., New York, N. Y., a corporation of Delaware Application October 5, 1954, Serial No. 460,390

Claims priority, application Netherlands October 29, 1953

4 Claims. (Cl. 310—156)

The present invention relates to a method of securing a member to a shaft. More particularly, the invention relates to a method of securing a member to a shaft by introducing the shaft into a hole through the said member, filling the space between the shaft and the wall of the hole with thermo-hardening cementing means and subsequently heating the member together with the shaft and the cement.

As is known, such methods render accurate proportioning of the hole of the member superfluous and permit, if desired, the use of a member consisting of several parts which are united by the cement to form an aggregate with the shaft.

Such methods, which are sometimes used in mass-production, have a limitation in that the space between the shaft and the wall of the hole, which is to be filled with cement, is hard to close in such manner that the cement does not flow out. Notably, in the initial stages of the heating operation, the cement is thinly liquid and tends to escape through narrow passages between the member and closure means or between the shaft and the said closure means and to harden through elsewhere, which may give rise to rejections.

In accordance with the present invention this is obviated by closing the said space at least at one end with a porous mass impregnated with a high-molecular organic silicon compound.

In accordance with the invention it has been found that such porous masses yield a satisfactory seal so that, as a rule, no steps are required to be taken to prevent any escaped cement from adhering to the jig by means of which the shaft and the member are held in place during the heating operation.

The porous mass is not wetted by the cement and such silicon compounds do not flow to a considerable degree, since their viscosity diminishes only slightly under the action of heat. The porous mass is preferably felt, since it has been found that felt impregnated with a high-molecular silicon compound readily withstands even comparatively high temperatures of 150 to 220° C. Other appropriate porous masses are made up of cellulose fibres or heat-resistant synthetic resins. Cements suitable for carrying out the method according to the invention are, for example, those on the basis of polyesters and solutions of polyesters of, for example, maleic acid and bivalent alcohol such as, for example, ethylene glycol and butylene glycol in styrene, allyl phthalate or the like. Further suitable cements are the epoxy resins such as, for example, the products commercially available as "Araldit," a trademark for a condensation product of polyaryl ethylene oxide derivates. Alternatively, phenol aldehyde condensation products may be used. The cements are usually mixed with filling materials and it has further been proposed to fill the space in part, for example with an annular object. The high-molecular organic silicon compounds used in accordance with the invention are oils or fatty substances such as, for example, methyl-, phenyl- and methylphenyl-"silicones."

A porous mass may be impregnated with a silicone by dissolving the latter in a volatile dissolvent, immersing the porous mass in the said solution, squeezing out the mass and causing the volatile dissolvent to vaporize from the mass. The impregnated porous mass is usually brought into such a form as to partly fill the usually annular cavity which may be 0.2 to 10 mm. wide.

The invention is of particular importance for securing a member to a shaft resting in a bearing, since in this manner hardening through of the cement on the shaft portion supporting the shaft is substantially precluded. However, the invention may also be used in the case of non-supported, non-circular and hollow shafts or tubes.

The invention may be used very advantageously for securing a ring consisting of oxidic permanent magnetic material to a shaft, thus obtaining a rotary magnet suitable for use in bicycle dynamos.

Such oxidic permanent magnetic materials, for example, those commercially available as "Vectolite," a trademark for a cobalt ferrous ferrite and "Ferroxdure," a trademark for a composite oxide containing iron and corresponding to the formula $MO.6Fe_2O_3$, where M represents one of the metals, lead, barium or strontium is very hard and brittle so that the grinding of such materials takes much time and give rise to rejection so that grinding is to be avoided as much as possible.

In order that the invention may be readily carried into effect it will now be described, by way of example, with reference to the accompanying drawing, wherein the single figure is a sectional view of an annular magnet secured to a shaft with the aid of the method of the present invention.

The reference numeral 1 denotes a jig in which is provided a shaft 2, 4 mm. in diameter, onto which a piece of felt 3 is slipped. The felt 3 is stamped into such a form as to embrace the shaft 2 and firmly engage the inner wall of a hole 4 of a magnet 5.

Before it is placed on the shaft, the felt piece 3 is immersed in a solution of the fatty silicon, commercially available as "DC 4" in trichlorethylene (1:3) squeezed out and subsequently heated in order to completely vaporize the trichlorethylene. The felt piece 3 is then slipped onto the shaft 2 and the shaft and member 5 are placed in the jig 1. The annular magnet 5 made from "Ferroxdure," whereof the cavity has a diameter of 8 mm., is introduced into the cavity of the jig 1 and the space 4 is filled, up to and above the shaft end, with epoxy resin, commercially available as "Araldit Type 1." The jig 1 is subsequently heated at 180° C. in an oven until the epoxy resin hardens through, which takes approximately one hour. It was found that no leakage had occurred and the felt piece 3 proved soft and elastic at the surface, hence it had not absorbed any appreciable quantity of cement. When felt not impregnated with an organic silicon compound is utilized, however, even if the cement is mixed with an equal quantity by weight of sand, the result may be different. In the said two methods, in which the fibrous mass, in contradistinction to the present invention, was not impregnated, a small quantity of the cement adjacent the felt piece on the shaft hardened through so that the shaft no longer fitted in the bearing. Tests on other impregnants such as, for example, paraffin and Vaseline proved that these substances are ineffective, probably because the impregnant becomes very thinly liquid during the heating operation and escapes for the greater part.

While the invention has been described by means of a specific example and in a specific embodiment, I do not wish to be limited thereto, for obvious modifications will occur to those skilled in the art without departing from the spirit and scope of the invention.

What is claimed is:

1. A method of securing a member having an aperture therein to a shaft having a smaller diameter than the corresponding diameter of said aperture, said shaft being spaced from the walls defining said aperture, comprising providing a porous mass impregnated with a high molecular weight silicon compound between said shaft and the walls of said member defining the aperture therein, applying a desired thickness of thermosetting cement over the impregnated porous mass, heating the member containing the shaft, porous mass, and cement to flow the cement into intimate contact with the wall portions of the member and the shaft to be joined thereto, and cooling the member to harden the cement and secure the shaft therein.

2. A method of securing a member having an aperture therein to a shaft having a smaller diameter than the corresponding diameter of said aperture, said shaft being spaced from the walls defining said aperture, comprising providing a seal constituted of a porous felt mass impregnated with a high molecular weight silicon compound between said shaft and the walls of said member defining the aperture therein, applying a desired thickness of thermosetting cement over the impregnated porous felt mass, heating the member containing the shaft, porous mass, and cement to flow the cement into intimate contact with the wall portions of the member and the shaft to be joined thereto, and cooling the member to harden the cement and secure the shaft therein.

3. A device comprising an annular permanent magnet constituted of oxidic ferromagnetic material and having an aperture therein, a shaft having a smaller diameter than the corresponding diameter of said aperture, a part of said shaft being positioned in said aperture in spaced relation from the inner surface thereof, a porous mass impregnated with a high molecular weight silicon compound positioned between part of said shaft and the inner surface of said aperture, and a thermosetting cement joining a selected surface of said shaft to a selected portion of the said inner surface of said aperture.

4. A device comprising an annular permanent magnet constituted of oxidic ferromagnetic material and having an aperture therein, a shaft having a smaller diameter than the corresponding diameter of said aperture, a part of said shaft being positioned in said aperture in spaced relation from the inner surface thereof, a seal comprising a porous felt mass impregnated with a high molecular weight silicon compound positioned between part of said shaft and the inner surface of said aperture, and a thermosetting cement joining a selected surface of said shaft to a selected portion of the said inner surface of said aperture.

References Cited in the file of this patent
UNITED STATES PATENTS

| | | |
|---|---|---|
| 2,459,543 | Schmerheim | Jan. 18, 1949 |
| 2,488,729 | Kooyman | Nov. 22, 1949 |
| 2,541,047 | Frisbie et al. | Feb. 13, 1951 |

OTHER REFERENCES

Abstract of Giradot application S. N. 160,516 August 5, 1952; 661, O. G. 310.